WILLIAM E. BUDD
ROBERT W. OKEY
INVENTORS.

BY: *J. Daniel Malone*

ATTORNEY.

United States Patent Office 3,472,765
Patented Oct. 14, 1969

3,472,765
MEMBRANE SEPARATION IN BIOLOGICAL-REACTOR SYSTEMS
William E. Budd, Ridgefield, and Robert W. Okey, Westport, Conn., assignors to Dorr-Oliver Incorporated, Stamford, Conn., a corporation of Delaware
Continuation of application Ser. No. 578,374, Sept. 9, 1966. This application June 10, 1968, Ser. No. 742,119
Int. Cl. C02c 1/02
U.S. Cl. 210—7
27 Claims

ABSTRACT OF THE DISCLOSURE

Techniques of carrying out biological reactions in conjunction with selectively pressure driven permeable membranes to effect high rate separation of biological life from a carrier liquid or a valuable product of the reaction.

CROSS REFERENCES TO RELATED APPLICATIONS

This application is a continuation of application Ser. No. 578,374, filed Sept. 9, 1966, and now abandoned.

BACKGROUND OF THE INVENTION

The present invention relates to novel systems and processes for carrying out biological-life reactions in liquid environments through utilization of selectively permeable membranes to separate the biological life from the carrier liquid or a valuable product of the reaction. The invention exemplarily relates to such systems and processes as applied in the treatment of sewage and industrial wastes.

Biological-reaction systems have heretofore been utilized in the treatment of sewage, for example activated sludge systems wherein aerobic biological life is the metabolic conversion agent. However, these systems are limited to relatively inefficient or disadvantageous operating conditions which are dictated by the phase separator, customarily a clarifier, which separates the solids, that is the biological life with the absorbed sewage nutrients, from the effluent water.

Clarifiers of practical size for sewage treatment facilities can handle a feed having a maximum solids concentration in the range of 0.5 to 1.0%, and most of these so-called secondary clarifiers in activated sludge plants operate on a 0.3 to 0.5% solids feed. To achieve these dilute feeds, primary clarifiers are utilized to prevent the easily settling nutrient solids in the raw sewage from entering the biological reaction system and thus adding to the load on the secondary clarifier. As an additional measure, the activated sludge reaction system, which receives the primary clarifier effluent, is operated so as to avoid a build-up of biological solids in excess of the above maximums. This limitation on concentration in conventional activated sludge systems creates several disadvantageous results: (1) larger components in the biological loop of the plant and/or lower retention times, (2) more dilute and therefore more voluminous wastage sludge from the activated sludge system, (3) a requirement for a primary clarifier, (4) greater solids quantities in the overall plant sludge discharge since primary sludge is not metabolized, and (5) a tendency to produce secondary effluents of questionable quality as the values of feed concentration to the secondary clarifier are pushed up toward the maximums in an attempt to alleviate the problems caused by these disadvantages. Additionally, clarifiers are incapable of separating dissolved solids which have not been metabolized or adsorbed by the biological life.

SUMMARY OF THE INVENTION

It is a primary object of the present invention to provide biological-reaction treatment systems and processes which obviate the disadvantages of the prior art.

To accomplish this object, the present invention provides two major components, the first being a biological reactor containing liquid-carried biological life. The reactor is adapted to receive a nutrient stream, for example raw sewage, and in the case of aerobic biological life, a supply of oxygen to sustain a metabolic conversion of the nutrients by the biological life. A stream of the contents of the biological reactor is withdrawn and circulated to the second major system component, a membrane separator. This separator has a selectively permeable membrane or membranes of such characteristics as to permit through-membrane transport of the carrier liquid and, in some applications of the invention, a valuable product of the reaction while preventing through-membrane flow of the biological life.

In waste-treatment applications of the present invention, the membrane preferably retains not only the biological life but also the large-moleculed, refractory or slowly biodegradable organic nutrients whereby sufficient opportunity and time is provided for the metabolic conversion of these nutrients. In certain applications it may be desirable to utilize a membrane which passes dissolved non-biodegradables or inorganics into the effluent. In other applications of the invention, the biological life may produce products in which case it may be desirable for these products to pass through the membrane for subsequent separation and recovery.

As the membrane separation operations occurring in the present invention are reverse osmosis and ultra-filtration, a pressurized feed to the membrane separator is utilized so as to establish the required pressure drop across the membrane. The carrier liquid passes through the membrane and exits from the membrane separator as an effluent stream. The biological life and the major portion of the carrier liquid are retained on the feed side of the membrane and exit from the membrane separator as a so-called concentrate stream. This concentrate stream is recirculated back across the membrane to permit further membrane-separation action thereon. This recirculation is accomplished by direct recycling and/or return recirculation through the biological reactor. Provision is also made for a bleed off of biological solids from the system to permit control of the solids concentration and/or recovery of a valuable-product type of biological life.

Because of the specific-size separation characteristics of semipermeable membranes, effluent quality is not adversely effected by the concentration of the feed to the separator. Therefore, the biological reaction systems of the present invention can be operated at much higher solids concentrations than possible heretofore. Consequently, the present invention, as applied to sewage treatment systems, permits the biological reactor to directly accept raw sewage thus obviating the requirement for a primary clarifier. This results in metabolic conversion of the entire sewage nutrient stream and thus reduces the overall disposal-sludge solids quantity. Further, the wastage solids drawn from the biological reaction system are more concentrated and therefore less voluminous. Additionally, in the present invention the components of the reaction system are smaller because of the higher permissible solids concentrations. Finally, the plant effluent contains no biological solids despite the high solids concentrations, and it is of exceptionally high quality, having no bacteria and no known virus. Accordingly, the plant effluent needs no clorination before being discharged to a receiving water.

Accordingly, other objects of the present invention include:

(1) The provision of improved biological reaction systems wherein membrane separation devices are utilized to effect a phase separation of the biological life from its carrier liquid or a valuable product of the reaction.

(2) The provision of novel methods for operating continuous biological reactors at high concentrations of biological life.

(3) The provision of novel sewage treatment processes and systems wherein raw sewage is fed directly to a biological reactor and wherein a membrane separator is utilized to separate the biological life from the carrier liquid whereby high concentration levels of the biological life in the system are possible.

(4) The provision of membrane separation operations in biological reaction waste treatment processes to separate a pollution-free effluent stream of the carrier liquid from a concentrate stream containing the biological life, the unmetabolized nutrients, the bacteria, and the virus.

These and other objects of the invention will become apparent from the following description and appended claims when read in conjunction with the accompanying drawings wherein:

DESCRIPTION OF THE INVENTION

Figure 1:
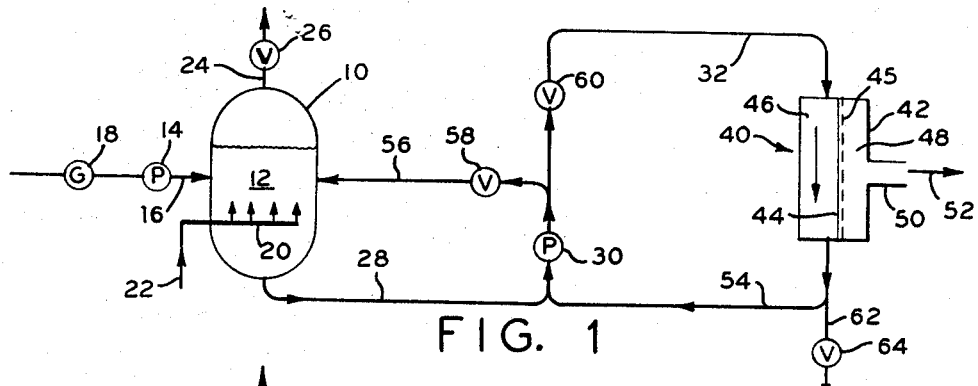
FIGURE 1 is a diagrammatic flowsheet showing the novel system of the present invention incorporating a biological reactor and ultrafiltration/reverse-osmosis membrane separator.

Referring now to the drawings in detail, FIGURE 1 shows a pressurized biological reactor 10 which contains a body of biological-life-carrying liquid 12. The biological life is sustained by nutrients supplied through pump 14 and conduit 16. In the application of the present invention to sewage treatment, a comminuter or grinder 18 is preferably incorporated in the nutrient supply line to reduce the size of particles in the raw sewage to permit their metabolic conversion and to prevent oversize particles from blocking the flow in the system, particularly in the membrane separator.

For those applications wherein the biological life in the reactor is aerobic, a disperser 20 is incorporated in the reactor and is connected to a suitable source of compressed air or oxygen 22 to provide the required oxygen for the metabolic conversion of the nutrient stream. The reactor also has a vent 24 having a suitable control device such as valve 26 to permit the escape of gases.

A stream of the contents of the reactor is extracted through a withdrawal conduit 28 and is circulated by a pump 30 through a feed conduit 32 to a membrane separator 40. The separator includes a suitable housing 42 which is divided by a selectively permeable membrane or plurality of membranes 44 into a feed passage 46 and an effluent space 48. The characteristics of membranes 44 are selected so that they perform a reverse-osmosis and ultrafiltration separation operation wherein the biological life is retained on the feed side of the membrane. As a pressure differential is maintained across membrane 44 to effect the reverse-osmosis and ultrafiltration, a perforate membrane support 45 is provided on the effluent side of the membrane. Housing 42 is provided with an effluent outlet 50 connecting with the effluent space 48. The carrier liquid and, in some applications, a valuable product of the reaction which pass through semi-permeable membranes 44 are collected in effluent space 48 and exit from the separator as an effluent stream 52.

The pressure differential across membrane 44 is effected by any suitable means, for example, by maintaining the pressure of the material being pumped through feed passage 46 of housing 42 at a value higher than the pressure in effluent space 48 of the housing. The latter pressure, in certain embodiments of the invention, may be atmospheric.

The material which is retained on the feed side of membranes 44, which includes the bulk of the carrier liquid as well as the biological life, passes out of feed space 46 as a somewhat concentrated stream through conduit 54. Concentrate conduit 54 leads back to the inlet side of the circulation pump so that at least a portion of the concentrate stream is directly recycled through feed conduit 32 to pass across the membrane again.

In order to maintain the desired concentration of biological life in reactor 10, a portion of the combined concentrate stream and reactor-withdrawal stream exiting from pump 30 is recirculated through the reactor by a return conduit 56. The division of the pump output to return conduit 56 and to feed conduit 32 is controlled by valves 58 and 60 in those respective conduits.

As the continued growth of biological life in the system may in time overload the system with biological life solids, a bleed conduit 62 with a control valve 64 is incorporated in the separator loop of the circulation system. In those processes wherein the biological life is itself a valuable product, bleed conduit 62 serves to withdraw such a valuable product from the reaction system.

Figure 2:
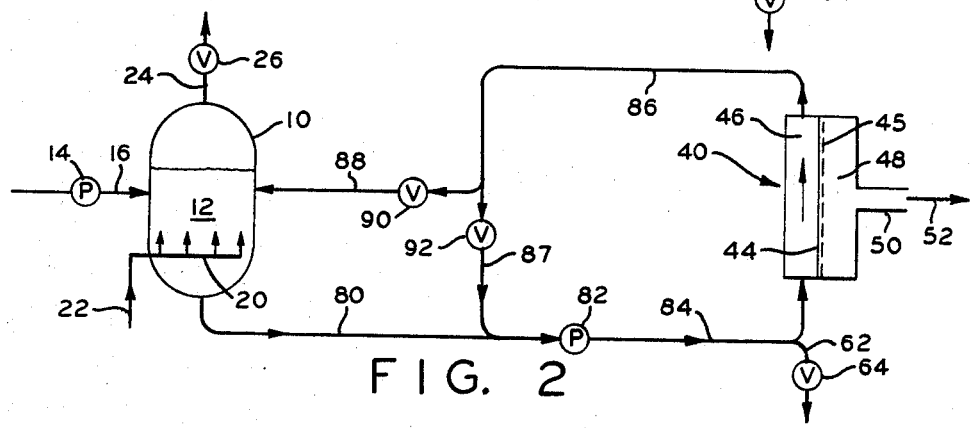
FIGURE 2 shows a diagrammatic flowsheet of a modified circulation arrangement for the components of the present invention.

The system illustrated in FIGURE 2 is generally similar to that of FIGURE 1, and the same reference numerals have been applied to identical components throughout. The primary differences between the systems of FIGURES 1 and 2 lie in the circulation arrangements. Thus, in FIGURE 2, a stream of the contents of reactor 10 is extracted through a withdrawal conduit 80 and is circulated by a pump 82 through a feed conduit 84 to the membrane separator. A portion of the concentrate leaving membrane feed space 46 through a concentrate conduit 86 is recirculated through reactor 10 by a return conduit 88, and another portion is directly recycled to the separator through recycle or bypass conduit 87. The split between the return and the direct-recycle portions of the concentrate stream is controlled by valves 90 and 92 respectively located in return conduit 88 and recycle conduit 87.

Figure 3:
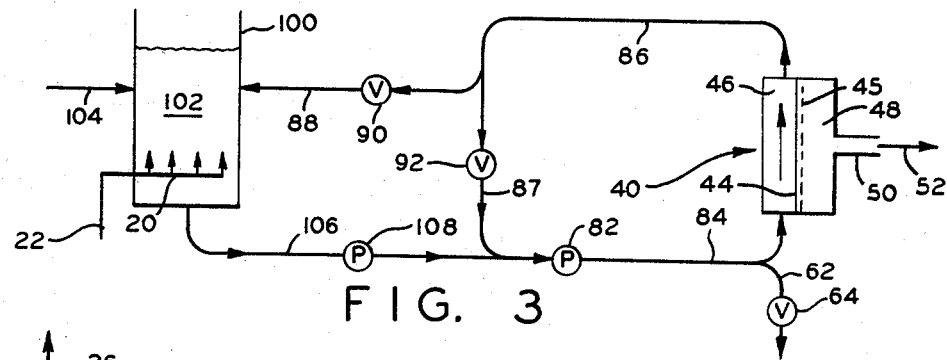
FIGURE 3 is a diagrammatic flowsheet showing a modified arrangement of the present invention wherein an ambient-pressure biological reactor is utilized.

The system of FIGURE 3 is generally similar to that of FIGURE 2, and accordingly the same reference numerals are applied to identical elements. The primary difference between these figures lies in the incorporation of an ambient pressure biological reactor 100 in FIGURE 3. Reactor 100 contains a body of biological-life-carrying liquid 102 and is supplied with nutrients through a nutrient conduit 104. A stream of the contents of reactor 100 is withdrawn through a conduit 106 and is introduced into the pressurized side of the system by a pump 108.

Figure 4:
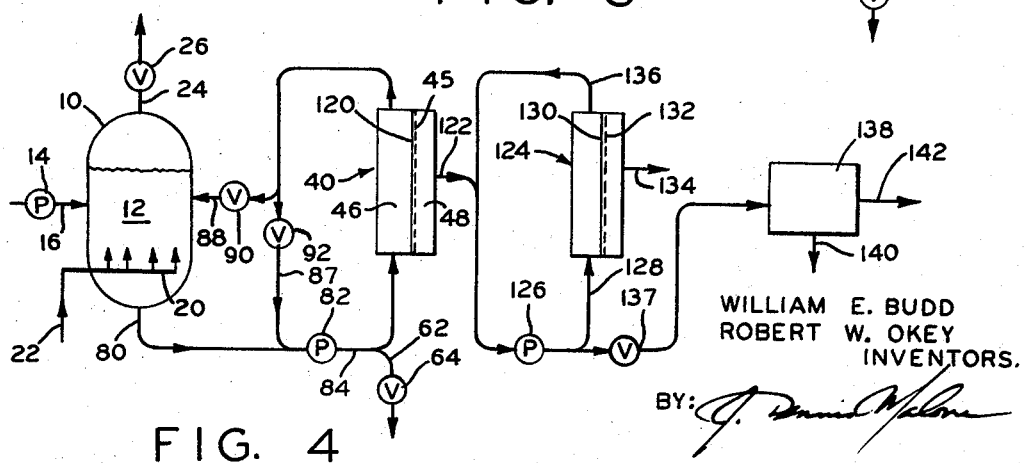
FIGURE 4 is a diagrammatic flowsheet showing a further embodiment of the present invention wherein a second-stage membrane is utilized to separate the first-stage effluent into fractions.

The system illustrated in FIGURE 4 is generally similar to that of FIGURE 2, and the same reference numerals are applied to identical elements. However, in FIGURE 4, membrane separator 40 is the first of two separator stages. Separator 40 incorporates a relatively "loose" membrane 120 which is selected to retain the biological life on the feed side thereof and to through-transport not only the carrier liquid but also certain molecules which are smaller than the biological life. For example, in certain applications, these molecules may be the inorganics or non-biodegradables contained in the stream supplied to the reactor. Alternatively, these molecules may be products resulting from the metabolic conversion. In either case, an effluent stream 122 containing these substances is discharged from separator 40 and is circulated to a second-stage separator 124 by a pump 126 through a feed conduit 128.

Separator 124 includes a membrane or membranes 130, a membrane support 132, and respective outlets connected to an effluent conduit 134, and a concentrate conduit 136. The concentrate conduit leads back to the inlet side of circulation pump 126 to directly recycle the concentrate across the membrane. Membrane 130 is a relatively "tight" membrane which in certain applications retains the inorganics or non-biodegradables and in other applications retains the valuable metabolic products while permitting at least the carrier liquid to pass through. In this manner, the repetitive recycling of the feed to the second-stage membrane produces a concentration of the effluent from the first stage. Periodically or continuously a portion of this concentrated stream is bled off through valved conduit 137 to a recovery or extraction unit 138 which operates on the concentrated bleed to separate the solids carried thereby from the carrier liquid. For example, unit 138 may operate by direct precipitation, adsorption-precipitation, ion exchange, solvent extraction, or distillation. The separated fractions are discharged from unit 138 through respective conduits 140 and 142.

Example

To specifically exemplify the use of the above-described systems and processes, an application of the invention to the sewage treatment field will be described in detail in connection with the flowsheet of FIGURE 1. Typical domestic raw sewage from a municipality is directly received for treatment by the present system. Such raw sewage is a very dilute water-borne composition having a few solid constituents in solution and a major portion of its solid constituents suspended in the water. This raw sewage is comminuted in grinder 18 to ensure a maximum particle size of approximately $\frac{1}{32}$ of an inch and is pumped into the biological reactor which is maintained at substantially the pressure required on the feed side of the membrane (in the range of 20 to 100 p.s.i.).

The reactor contains typical, water-borne, aerobic biological life such as commonly employed in activated-sludge sewage systems. The reactor contents are aerated with sufficient oxygen to sustain the metabolic conversion of the nutrient material in the raw sewage, and the gases produced by the metabolic conversion, primarily $CO_2$, and other waste gases are permitted to escape from the pressurized reactor through the controlled vent 24. The reactor is suitable sized, and the withdrawal and return flows are selected, to achieve a retention time in the reactor in the range of 20 to 30 minutes. The wastage of biological solids through bleed conduit 62 is controlled to maintain the system at a high concentration of biological life solids, for example 3%, with the load ratio of biological oxygen demand (BOD) to biological solids being in the order of .03 to 0.3.

The membrane in separator 40 in this exemplification was selected to achieve a separation size corresponding to molecular weights in the order of 200 to 400. Such a membrane effectively retains the biological life and substantially all of any unadsorbed or unmetabolized organic molecules or suspended particles from the raw sewage, while permitting transport of water and dissolved inorganics such as salts. The separation size of the membrane is preferably selected to be well below the size of the retained material and well above the size of the material to be passed through the membrane whereby degradation of the membrane flux rate from plugging-type phenomena is alleviated.

To consider the factors which affect the desirable volumetric flow rates in this exemplification of the invention, the sewage input to the reactor is assigned the unitary volumetric flow value of Q. The flow in the return loop of the system is governed by the need to avoid depletion of the biological population in the reactor. Since under steady-state operating conditions, the reactor withdrawal rate exceeds the return rate to the reactor by 1Q and since the return flow to the reactor is somewhat more concentrated than the withdrawal flow, population depletion can be avoided by increasing the recirculation through the reactor so as to offset the 1Q excess withdrawal rate. In this exemplification of the invention, it was found that a return recirculation value of 20Q was satisfactory to achieve the above purposes. Therefore, the withdrawal flow in conduit 28 is 21Q and the return flow to the reactor through conduit 56 is 20Q.

The determinative factors affecting the desirable flow rates in the separator emanate from the membrane itself. To alleviate the adverse effects of concentration gradients which tend to build up transversely to the surface of the membrane as the feed progresses along it, turbulent flow is preferred over the membranes to minimize these concentration gradients. Further, higher flow velocities and the corresponding turbulence along the membranes assist in a "scrubbing" action to inhibit the buildup or deposit of solids or a cake on the surfaces of the membrane. Therefore, for efficient membrane operation the feed rate to the separator should be of high magnitude in relation to the effluent rate, for example in the range of 100 times as great for a specific type and arrangement of membrane surfaces in the separator. Therefore, since the effluent flow from the separator is substantially 1Q under steady-state operations, the feed rate in conduit 32 may be 101Q and the concentrate flow in conduit 54 may be 100Q.

Desirable upper limits on the flow through the separator are dictated by the fact that the membranes can be damaged by erosion at excessively high velocities and/or that membranes 44 may be physically peeled off supporting structures 45. Further, it is obvious that from a pump-power viewpoint, the recirculation through the reactor as well as the direct recycling of the concentrate are desirably kept to the minimums permitted by the above-mentioned flow requirements.

As best understood in reference to the flowsheet of FIGURE 2, the split between the return flow in conduit 88 and the direct recycle flow in conduit 87 can be varied anywhere between the extremes of 100% return and 100% recycle by appropriate manipulation of valves 90 and 92. Assuming the flow requirements described above indicate that flow through the membrane separator should be at least 100Q and the return flow to the reactor should be at least 20Q, it is clear that these minimums are met by returning the entire 100Q concentrate flow from the separator to the reactor with no direct recycle or bypass flow through conduit 87. However, a reduction of pumping power can be achieved while maintaining desired minimum flows, by recycling 80Q through bypass conduit 87 and by returning 20Q through conduit 88.

Further, if it is desirable to increase the concentration of biological solids in the separator loop of the circulation system, for example in preparation for bleeding off solids, return valve 90 may be closed. (This corresponds to closing return valve 58 in FIGURE 1, under which conditions the two flowsheets are identical.) This action causes a depletion of biological solids from the reactor and transfers them to the recycling flow in the separator loop thus increasing the solids concentration therein. In installations in which the volume of the separator loop is small in comparison to that of the reactor, this concentration in the separator loop can be accomplished without a proportionate decrease in the biological life concentration in the reactor.

In the exemplary utilization of the present invention in sewage treatment, the effluent from the membrane device is of very high quality. Specifically, the biological oxygen demand (BOD) of the effluent is in the order of 3 milligrams per liter, the chemical oxygen demand (COD) in the order of 20 milligrams per liter, with no bacteria, and no known virus. These high quality effluents are attributable to the retention of the slowly biodegradable molecules as well as the bacteria and virus by the membrane. Effluent of this quality is suitable for discharge into receiving waters without further treatment, and therefore the present invention obviates the requirement for chlorinating the effluent prior to its discharge.

As a further advantage, the present membrane separator can operate efficiently at very high concentrations of the biological solids. Although in the example a 3% biological solids concentration was utilized, the separator can effectively operate at concentrations as high as 7 to 12%. The factors limiting these maximum concentrations are (1) excessive viscosity which causes higher pump-power requirements and flow distribution problems in the membrane separator, and (2) the undesirable competition between such thick slurries and the membranes for the available water. In other words, above the maximum limits of concentration, the membrane cannot effectively withdraw water from the feed slurry despite the pressure drop existing across the membrane.

The ability of the membrane separator to efficiently operate on these thick, high-biological-solids-concentration slurries is a distinct contrast to prior art metabolic sewage treatment plants wherein the biological reactor is commonly operated at about 0.3 to 0.5% solids concentration because of the limitations of the secondary clarifier. Consequently, with these higher permissible biological-life concentrations, the size of the reactor can be reduced while still allowing for complete adsorption of the sewage nutrients upon the biological life in the reactor.

A further advantage resulting from the operation of the system at high solids concentration is that the periodic bleedoff of excess biological life occurs at the higher concentrations. Therefore, the waste sludge has a much lower volume per weight of solids, and this eliminates the need for a thickening step which is commonly utilized in the prior art activated sludge systems.

Finally, because of the capability of the phase separator of the present invention to operate at very high solids concentration, the need for the conventional prior art primary clarifier is obviated, and in the present invention raw sewage can be fed directly to the biological reactor. This effects not only a capital saving, but it also means that the entire nutrient supply in the raw sewage is subjected to metabolic conversion whereby the total weight of solids for disposal is reduced.

As this invention may be embodied in several forms without departing from the spirit or essential characteristics thereof, the present embodiments are illustrative and not restrictive. The scope of the invention is defined by the appended claims rather than by the description preceding them, and all embodiments which fall within the meaning and range of equivalency of the claims are therefore intended to be embraced by those claims.

We claim:

1. A process for operating a biological reactor at a high concentration of biological solids comprising the steps of:
   (a) providing nutrients for the liquid-carried biological life in the reactor;
   (b) maintaining suitable conditions in the biological reactor to sustain the metabolic conversion of the nutrients;
   (c) drawing off a biological-life-containing stream from the reactor;
   (d) circulating the biological-life-containing stream at a first pressure past one side of a semipermeable membrane for operatively retaining the biological life on said one side of the membrane while permitting through-membrane transport of the carrier liquid;
   (e) draining the carrier liquid from the opposite side of the membrane at a second pressure lower than said first pressure as an effluent stream;
   (f) maintaining the pressure drop across the membrane from said one side to the opposite effluent side thereof to force through-membrane transport of the carrier liquid so as to concentrate the biological-life-containing stream;
   (g) and returning at least a portion of the concentrated, biological-life-containing stream circulating past said one side of the membrane back to the reactor to maintain a high biological-solids concentration therein.

2. A process as defined in claim 1 together with the step of operating the biological reactor at substantially the same pressure as maintained on said one side of the membrane whereby said step of returning concentrate to the reactor is accomplished without substantial pressure-head losses.

3. A process for operating a biological reaction system to achieve a high concentration of biological solids comprising the steps of:
   (a) providing nutrients for the liquid-carried biological life in the reactor;
   (b) maintaining suitable conditions in the biological reactor to sustain the metabolic conversion of the nutrients;
   (c) drawing off a biological-life-containing stream from the reactor;
   (d) circulating the biological-life-containing stream at a first pressure past one side of a semipermeable membrane selected to retain the biological life on said one side of the membrane while permitting through-membrane transport of the carrier liquid so as to concentrate the biological-life-containing stream;
   (e) draining the carrier liquid from the opposite side of the membrane at a second pressure lower than said first pressure as an effluent stream;
   (f) and recycling at least a portion of the concentrated, biological-life-containing stream circulating past said one side of the membrane directly back past the membrane to repetitively subject the biological-life-containing stream to the concentrating action of the membrane.

4. A process as defined in claim 3 further comprising the step of withdrawing a portion of the repetitively concentrated stream to remove biological solids from the reaction system in concentrated form.

5. The process as defined in claim 3 further comprising the steps of:
   (a) dividing the concentrated, biological-life-containing stream circulating past said one side of the membrane into portions, one of the portions being subjected to said recycling step;
   (b) and returning another of the divided portions to the biological reactor to maintain the biological-life population therein.

6. A process as defined in claim 5 further comprising the steps of:
   (a) periodically changing the divisional relationship of the concentrate-stream portions to increase the recycled portion and to decrease the returned portion whereby the solids concentration in the reactor is decreased and the solids concentration in the recycle stream is increased;
   (b) and periodically withdrawing a portion of the increased-solids-concentration recycle stream to remove biological solids from the reaction system in concentrated form.

7. A process of treating a raw-waste-carrying liquid stream comprising the steps of:
   (a) feeding the raw-waste stream to a biological reactor as a nutrient supply for aerobic biological life contained in the reactor;
   (b) supplying the biological life in the reactor with oxygen to support the metabolic conversion of the waste nutrients;
   (c) drawing off a biological-life-containing stream from the reactor;
   (d) feeding the biological-life-containing stream to one side of a selectively permeable membrane at a first pressure;

(e) retaining the biological life on said one side of the membrane while through-transporting an effluent stream of carrier liquid to the opposite side of the membrane;

(f) draining the effluent stream from the opposite side of the membrane at a second pressure lower than said first pressure;

(g) removing the biological life retained by the membrane from said one side thereof as a concentrate stream;

(h) and recirculating at least a portion of the concentrate stream back to the biological reactor.

8. A process as defined in claim 7 wherein said steps of drawing off a stream from the reactor and recirculating a portion of the concentrate stream back to the reactor are so performed as to achieve a reactor retention time in the range of 10 to 30 minutes.

9. A process as defined in claim 7 together with the step of withdrawing a sufficient wastage portion of the concentrated biological-life-containing stream so as to maintain a biological solids concentration in the range of 1 to 12% in the reactor.

10. A process as defined in claim 7 further comprising the step of retaining slowly biodegradable nutrients on said one side of the membrane whereby such nutrients are returned to the reactor for metabolic conversion.

11. A process as defined in claim 7 further comprising the step of transporting through the membrane to the effluent stream non-biodegradables contained in the waste stream.

12. A process as defined in claim 7 further comprising the step of retaining bacteria and virus present in the waste stream on said one side of the membrane to prevent such virus and bacteria from discharging with the effluent stream.

13. A process as described in claim 7 further comprising the steps of:
(a) dividing the concentrate stream into portions, one portion being subjected to said recirculating step;
(b) and recycling another of the divided portions back past said one side of the membrane to increase the feed flow to the membrane.

14. A process for operating a biological reactor comprising the steps of:
(a) feeding a nutrient stream to a biological reactor containing liquid-carried biological life;
(b) maintaining suitable conditions in the biological reactor to sustain the metabolic conversion of the nutrients;
(c) drawing off a biological-life-containing stream from the reactor;
(d) circulating the biological-life-containing stream past one side of a first-stage semipermeable membrane at a first pressure;
(e) retaining the biological lfe on said one side of the membrane while transporting through the membrane carrier liquid and molecules smaller than a first selected size which is smaller than the biological life;
(f) draining the effluent carrier liquid and molecules from the first-stage membrane at a second pressure lower than said first pressure and circulating same past one side of a second-stage semipermeable membrane at a third pressure;
(g) retaining molecules larger than a second selected size, which is smaller than the first selected size, on said one side of the second-stage membrane while transporting carrier liquid through the membrane to the opposite side thereof;
(h) draining the carrier liquid from the opposite side of the second-stage membrane at a pressure which is lower than said third pressure;
(i) discharging the retained molecules from said one side of the second-stage membrane as a concentrate stream;

(j) and recycling the second-stage concentrate stream back past the second-stage membrane to repetitively subject the molecule-containing stream to the concentrating action of the second-stage membrane.

15. A process as defined in claim 14 together with the step of withdrawing a portion of the repetitively concentrated stream to remove from the reaction system molecules having a size falling between the first and the second selected sizes.

16. A process as defined in claim 15 further comprising the step of separating the molecules from the carrier liquid of the withdrawn portion of the repetitively concentrated stream.

17. A biological-reaction system comprising:
(a) a reactor for containing liquid-carried biological life capable of metabolizing nutrients;
(b) means for supplying nutrients to said reactor;
(c) a membrane separator having a selectively-permeable membrane capable of transporting carrier liquid through the membrane while preventing through-transport of the biological life;
(d) pumping means for withdrawing biological-life-carrying liquid from said reactor and passing it across one surface of said membrane at a first pressure;
(e) drainage means for discharging, at a second pressure which is lower than said first pressure, the carrier liquid which has passed through said membrane;
(f) means for discharging from said membrane separator the biological life retained by said membrane as a concentrate stream;
(g) means for returning at least a portion of the concentrate stream to the biological reactor;
(h) and means for recycling another portion of the concentrate stream directly back past the membrane to repetitively subject the biological-life-containing stream to the concentrating action of the membrane.

18. A biological-reaction sewage treatment system comprising:
(a) a reactor for containing liquid-carried biological life capable of metabolizing the dissolved and suspended nutrients of the sewage;
(b) means for supplying the sewage nutrients to said reactor;
(c) a membrane separator having a selectively permeable membrane capable of transporting molecules of the carrier liquid through the membrane while preventing through transport of the biological life;
(d) pumping means for withdrawing biological-life-carrying liquid from said reactor and passing it across one surface of said membrane at a first pressure;
(e) effluent means for draining, at a second pressure which is lower than said first pressure, the carrier liquid which has passed through said membrane;
(f) means for discharging from said membrane separator the biological life retained by said membrane as a concentrate stream;
(g) means for returning at least a portion of the concentrate stream to the biological reactor;
(h) and means for recycling another portion of the concentrate stream directly back past the membrane to repetitively subject the biological-life-containing stream to the concentrating action of the membrane.

19. A system as defined in claim 18 wherein said selectively permeable membrane has a separation size in the range corresponding to molecular weights of 200 to 400 thereby retaining the biological life and unmetabolized organic nutrients while permitting through-transport of water and dissolved inorganics.

20. A system as defined in claim 18 wherein said supply means is adapted to introduce raw sewage into said biological reactor whereby all nutrients in the sewage are presented for biologic metabolization.

21. A system as defined in claim 20 wherein said nutrient supply means includes a comminutor for reducing the size of the raw sewage particles so as to avoid oversize-particle-blockage in the system and to expedite metabolic conversion of such particles.

22. A process for operating a biological-reaction system comprising the steps of:
   (a) providing nutrients for the liquid-carried biological life in the reactor;
   (b) maintaining suitable conditions in the biological reactor to sustain the metabolic conversion of the nutrients into metabolic products;
   (c) drawing off a stream containing biological life and metabolic products from the reactor;
   (d) circulating the drawn off stream at a first pressure past one side of a selectively permeable membrane to retain the biological life on said one side of the membrane while permitting through-membrane transport of the carrier liquid and the metabolic products;
   (e) draining the carrier liquid and the metabolic products from the opposite side of the membrane at a second pressure lower than said first pressure;
   (f) and recycling at least a portion of the biological-life-containing stream circulating past said one side of the membrane directly back past the membrane to repetitively subject the biological-life-containing stream to the separating action of the membrane.

23. A process as defined in claim 22 further comprising the steps of:
   (a) dividing the concentrated, biological-life-containing stream circulating past said one side of the membrane into portions, one of the portions being subjected to said recycling step;
   (b) and returning another of the divided portions to the biological reactor to maintain the biological-life population therein.

24. A process for operating a biological reactor comprising the steps of:
   (a) feeding a nutrient stream to a biological reactor containing liquid-carried biological life;
   (b) maintaining suitable conditions in the biological reactor to sustain the metabolic conversion of the nutrients into metabolic products;
   (c) drawing off a stream containing biological life and metabolic products from the reactor;
   (d) circulating such stream past one side of a first-stage semipermeable membrane at a first pressure;
   (e) retaining the biological life on said one side of the membrane while transporting through to the opposite side of the membrane carrier liquid and metabolic conversion products;
   (f) draining the effluent carrier liquid and metabolic products from the first-stage membrane at a second pressure which is lower than said first pressure and circulating same past one side of a second-stage semipermeable membrane at a third pressure;
   (g) retaining a valuable metabolic product on said one side of the second-stage membrane while transporting at least carrier liquid through the membrane to the opposite side thereof;
   (h) draining the carrier liquid from the opposite side of the second-stage membrane at a pressure which is lower than said third pressure;
   (i) discharging the retained product from said one side of the second-stage membrane as a concentrate stream;
   (j) and recycling the second-stage concentrate stream back past the second-stage membrane to repetitively subject such stream to the separating action of the second-stage membrane.

25. A process as defined in claim 24 together with the step of withdrawing a portion of the recycling concentrate stream to remove from the reaction system the valuable metabolic product.

26. A process as defined in claim 25 further comprising the step of separating the valuable metabolic product from the carrier liquid of the withdrawn portion of the recycling concentrate stream.

27. A biological-reaction system comprising:
   (a) a reactor for containing liquid-carried biological life capable of metabolizing nutrients to form a product;
   (b) means for supplying nutrients to said reactor;
   (c) a membrane separator having a selectively permeable membrane capable of transporting carrier liquid and a metabolic product through the membrane while preventing through-transport of the biological life;
   (d) pumping means for withdrawing liquid from said reactor and passing it across one surface of said membrane at a first pressure;
   (e) drainage means for discharging, at a second pressure which is lower than said first pressure, the carrier liquid and metabolic product through said membrane;
   (f) means for discharging from said membrane separator the biological life retained by said membrane as a concentrate stream;
   (g) means for returning at least a portion of the concentrate stream to the biological reactor;
   (h) and means for recycling another portion of the concentrate stream directly back past the membrane to repetitively subject the biological-life-containing stream to the concentrating action of the membrane.

References Cited

UNITED STATES PATENTS

| 3,186,917 | 6/1965 | Gerhardt et al. | 195—103.5 X |
| 3,188,288 | 6/1965 | Smith | 210—11 |

OTHER REFERENCES

Ellis, C.B., Fresh Water From the Ocean, 1954, Ronald Press Co., New York, page 98 relied on.

MICHAEL E. ROGERS, Primary Examiner

U.S. Cl. X.R.

195—115, 139; 210—11, 23, 195, 203, 321, 433